March 17, 1942.  F. SCHMID  2,276,908
INFINITELY VARIABLE SPEED GEAR
Filed April 26, 1940   2 Sheets-Sheet 2
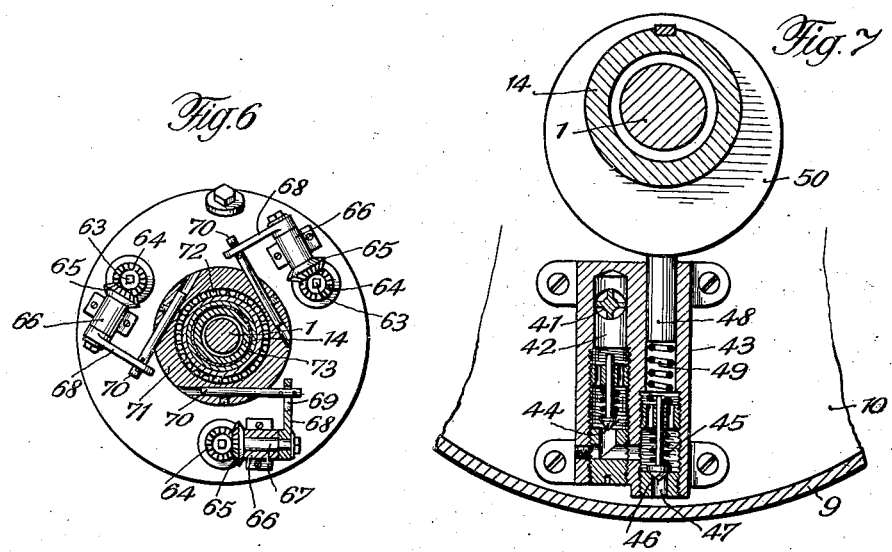
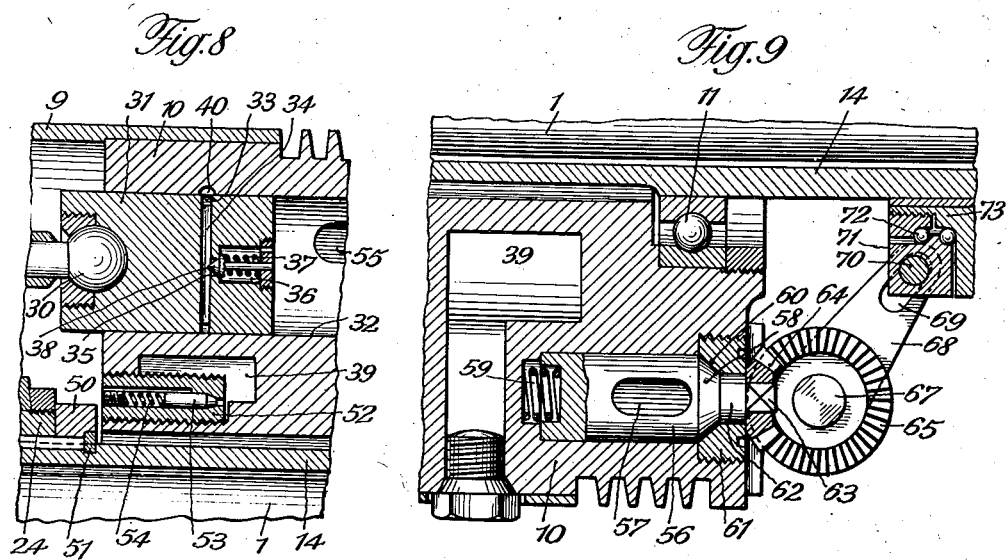
Inventor:
Franz Schmid
by Sommers + Young
Attorneys Patented Mar. 17, 1942

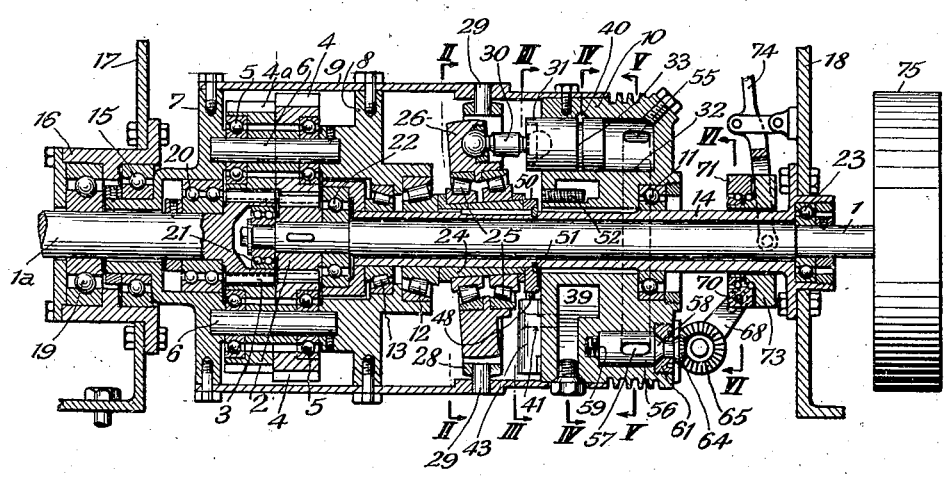

2,276,908

UNITED STATES PATENT OFFICE 2,276,908

INFINITELY VARIABLE SPEED GEAR

Franz Schmid, Lucerne, Switzerland

Application April 26, 1940, Serial No. 331,860
In Switzerland May 27, 1939

12 Claims. (Cl. 74—293)

This invention relates to infinitely variable change speed gears in which one of the central wheels of a planetary gear is fixed to the driving shaft and the second central wheel of the planetary gear is fixed to the driven shaft and in which between the planet wheel carrier and a stationary support means are provided by the instrumentality of which the speed of the planet wheel carrier can be infinitely varied.

In the accompanying drawings an embodiment of the invention is illustrated by way of example only, in which Fig. 1 shows a longitudinal section taken through the axis of the variable speed gear according to the invention;

Figs. 2 to 6 are sections along the lines II—II, III—III, IV—IV, V—V and VI—VI, respectively, of Fig. 1;

Fig. 7 is an axial part section on a larger scale, and

Figs. 8 and 9 are partial sections of details of Fig. 1 on a larger scale.

The driving shaft which is designated by 1 has keyed to its inner end a central wheel 2 of a planetary gear. The second central wheel 3, which is of larger diameter than wheel 2, of the gear is mounted on the driven shaft 1a. The two coaxial central wheels 2, 3 intermesh, respectively, with planet wheels 4 and 4a which are mounted by means of ball bearings 5 on bearing pins 6 being secured between two parts forming a planet wheel carrier. These two parts of the planet wheel carrier 7, 8 are fastened interiorly of a cylindrical liner 9 to the inside of which is further connected a cylinder block 10. The assembly comprising the planet wheel carrier 7, 8, the liner 9 and the cylinder block 10 is mounted at one end, by means of a ball bearing 11, and at the central portion, by means of two roller bearings 12, 13, on a stationary sleeve 14 surrounding the driving shaft. The other end of this assembly is mounted in a mounting member 16, by means of a ball bearing 15, which member is secured to a bearing shield 17, whereas the sleeve 14 is fastened to a bearing shield 18. In the mounting member 16 is further mounted, by means of a ball bearing 19, the driven shaft 1a, which is also mounted in the part 7 of the planet wheel carrier by means of a ball bearing 20. The adjacent ends of the two shafts 1, 1a are mutually engaged by a ball bearing 21, and the shaft 1 is carried by the ends of the sleeve 14 by means of ball bearings 22, 23 respectively.

To the sleeve 14 is keyed a sleeve 24 having a cylindrical portion the axis of which is inclined to the axis of the shaft 1 and to the sleeve 14, so that a tumbler disc 26 mounted on the cylindrical portion of the sleeve 24 by means of roller bearings 25 rotates in a plane which is obliquely disposed to the axis of the shaft 1. The tumbler disc 26 is circumferentially connected with a pivotal ring 28 by means of two diametrically opposed studs 27 (Fig. 2), which ring is mounted in the liner 9 at two points offset relatively to the studs 27 by 90°, by means of studs 29, by which means the tumbler disc 26 is moved along by rotation of the liner 9. By this means between the liner and the tumbler disc a universal joint is provided.

Axially disposed pistons or plugs 31 are connected with the tumbler disc 26 at three points spaced apart by angular ranges of 120° (Fig. 4), by means of studs 30 having terminal spherical jointing heads, the plugs being shiftable in cylindrical bores 32 of the cylinder block 10. Each plug 31 is provided with an annular groove 33 which communicates via a diametrical passage 34 with an axial passage 35 of the plug (Fig. 8) which passage leads into a valve chamber 36 communicating with the bore which accommodates the plug and housing a conical valve body 38 which is acted upon by the pressure of a spring 37. In the cylinder block 10 a supply chamber 39 surrounding the sleeve 14 and containing pressure liquid is arranged (Fig. 4) from which chamber start passages 40 which lead into the bores accommodating the plugs 31 approximately at the point where the annular groove 33 is positioned at the end of the suction stroke of the respective plug 31 (Fig. 1).

The supply chamber 39 communicates via a passage 41 with a space 42 (Fig. 7), which is provided in a pump casing 43 screwed onto the cylinder block 10 laterally thereof (Fig. 1). The space 42 is connected with a chamber 45 of an auxiliary pump via a spring-loaded non-return valve 44 and suitable communication passages, a spring-loaded suction valve 46 keeping closed an inlet opening 47 leading into the pump chamber. A compression spring 49 forces the pump piston 48 against an eccentric disc 50 which is firmly held in engagement with the sleeve 24 by a set ring 51 sunk in the sleeve 14 (Figs. 1 and 8), whereby the sleeve 24 is at the same time securely retained between the disc 50 and the inner race ring of the roller bearing 12 against axial displacement. A casing 52 of a pressure equalizing valve is screwed into the cylindrical block 10 (Figs. 1, 3 and 8), the body 53 of this valve being loaded by a compression spring 54 (Fig. 8). On the setting up of a rise in pressure in the supply chamber 39 the valve 53 opens against the pressure of the spring 54, so that liquid can pass from the chamber 39 via the pressure equalizing valve into the hollow space within the liner 9.

The three cylinders 32 are interconnected by an annular circulation channel 55 in the middle of each section of which extending between two adjacent cylinders a throttling member in the form of a cylindrical rotary valve 56 is included which is provided with a control passage 57 (Fig. 9) the cross section of which corresponds to that of the channel 55. The rotary valve 56 is provided with a conical shoulder 58 (Figs. 1 and 9), having a ground precision fit, by means of which the rotary valve bears under the pressure of a compression spring 59 against a mating correspondingly fitting conical face 60 of a sealing ring 61 which is screwed into the cylinder block 10 and bears with a ground end face thereof tightly against a mating ground surface of the cylinder block 10. The rotary valve 56 is further provided with a cylindrical neck 62 fitting in a bore of the ring 61, and with a square head 63 which is connected to this neck and carries a bevel gear wheel 64 which is axially displaceably but non-rotatably mounted on said neck. A bevel gear wheel 65 which cooperates with the bevel gear wheel 64 is arranged on a stub shaft 67 which is mounted in a bearing 66 secured to the block 10 (Fig. 6) and which further carries a lever arm 68 the outer end of which has a slot 69 interengaging with a rod 70 (Fig. 6). The three rods 70 associated with the three rotary valves are firmly united by a control ring 71 which is rotatably mounted by means of balls 72 on a socket 73 which is axially displaceable by means of a hand lever 74 (Fig. 1). On the driving shaft 1 a brake disc 75 is arranged for effecting the speed variation in the variable speed gear devoid of predetermined speed stages.

Assuming the driven shaft 1a to be at rest, the gear 2 will then turn idly with the shaft 1 and turns gears 4 in the opposite direction. The gears 4a then roll over the surface of gear 3, which is at rest, so that the gears 4, 4a and carrier 7, 8 move in the opposite direction to the driving shaft. The rotary valves 56 then opening by being correspondingly controlled by means of the hand lever 74 permit the liquid to be circulated through the circulation channel unimpeded. As the circulation of the liquid is slightly throttled by turning the rotary valves 56 in the opposite direction than before, by means of the hand lever 74, the speed of the planet wheel carrier 7, 8 is somewhat reduced by the opposition to the rotation of the carrier being increased by the axial movement of the tumbler disc 26 being more resisted by corresponding braking actions of the plugs 31. In this condition of control of the gear the driven shaft 1a is rotated at a slow rate of speed. By further throttling the circulation of liquid the speed of the planet wheel carrier 7, 8 is still more reduced, whereby the speed of the driven shaft is accordingly increased. In completely throttling the circulation of liquid the planet wheel carrier 7, 8 is stopped and the driven shaft 1a is turned at a higher speed than the driving shaft 1.

By this means the speed of the driven shaft 1a can be varied without resorting to predetermined speed stages, that is, infinitely varied. During each suction stroke the pressure liquid having passed through between the bore of the cylinder 32 and the plug 31 is sucked back from the annular groove 33 into the circulating stream of liquid while at the same time any leakage of liquid from the circulating stream that may have occurred is replenished. This is due to the fact that pressure liquid is free to pass from the supply chamber 39 via communication spaces 40, 33, 34, 35 and valve 38 into the liquid circulating stream at the end of the suction stroke.

The infinitely variable speed gear according to the invention is of a most compact construction. The rotary valve 56 is well sealed without the employment of a stuffing box owing to pressure engagement between the ground mating conical surfaces 58 and 60 on the rotary valve and on the sealing rings 61, respectively, fitting each other precisely. By effect of wear further grinding is set up between the mating surfaces, so that a tight fit thereof is automatically maintained, and the mating surfaces remain pressed on each other at all times, in consequence of which the rotary valve never needs to be readjusted.

What I claim is:

1. In an infinitely variable speed gear, a driving shaft and a driven shaft, planetary gearing, a planet wheel carrier arranged in said planetary gearing, planet wheels rotatably mounted on said planet wheel carrier, two central wheels included in said planetary gearing in driving association with said planet wheels, one of said central wheels being fixed on said driving shaft and the second of said central wheels being fixed on said driven shaft, a support stationarily mounted relative to the variable speed gear, a revolvably mounted piston operated liquid pumping means intercalated between said stationary support and said planet wheel carrier, a closed liquid circulation channel communicating with said pumping means, and throttling means included in said channel for infinitely varying the speed of said carrier.

2. In an infinitely variable speed gear, a driving shaft and a driven shaft, planetary gearing, a planet wheel carrier arranged in said planetary gearing, planet wheels rotatably mounted on said planet wheel carrier, two central wheels included in said planetary gearing in driving association with said planet wheels, one of said central wheels being fixed on said driving shaft and the second of said central wheels being fixed on said driven shaft, a support stationarily mounted relative to the variable speed gear, piston operated liquid pumping means intercalated between said stationary support and said planet wheel carrier with their pistons extending longitudinally of said variable speed gear, a tumbler carried by said support for actuating said pistons, a closed liquid circulation channel communicating with said pumping means, and throttling means included in said channel for infinitely varying the speed of said carrier.

3. In an infinitely variable speed gear, a driving shaft and a driven shaft, planetary gearing, a planet wheel carrier arranged in said planetary gearing, a liner surrounding the variable speed gear and connected to said planet wheel carrier, planet wheels rotatably mounted on said planet wheel carrier, two central wheels included in said planetary gearing in driving association with said planet wheels, said central wheels being fixed to said driving shaft and said driven shaft respectively, a support stationarily mounted relative to the variable speed gear, piston operated liquid pumping means intercalated between said stationary support and said planet wheel carrier with their pistons extending longitudinally of said variable speed gear, a tumbler carried by said support for actuating said pistons, a closed liquid circulation channel communicating with said pumping means, a cylinder block connected to said liner and housing said pumping means and said channel, a universal joint interconnecting said liner and said tumbler, and throttling means included in said channel for infinitely varying the speed of said carrier.

4. In an infinitely variable speed gear, a driving shaft and a driven shaft, planetary gearing, a planet wheel carrier arranged in said planetary gearing, a liner surrounding the variable speed gear and connected to said planet wheel carrier, planet wheels rotatably mounted on said planet wheel carrier, two central wheels included in said planetary gearing in driving association with said planet wheels, said central wheels being fixed to said driving shaft and said driven shaft respectively, a support stationarily mounted relative to the variable speed gear, piston operated liquid pumping means intercalated between said stationary support and said planet wheel carrier with their pistons extending longitudinally of said variable speed gear, a tumbler carried by said support for actuating said pistons, a closed liquid circulation channel communicating with said pumping means, a cylinder block connected to said liner and housing said pumping means and said channel, a universal joint interconnecting said liner and said tumbler, rotary valves included in said circulation channel in said cylinder block with their axes extending longitudinally of said variable speed gear for infinitely varying the speed of said carrier, a sealing ring arranged in said block coaxially with each of said valves, and a conical shoulder on each of said valves elastically bearing against a mating conical face on the respective sealing ring.

5. In an infinitely variable speed gear, a driving shaft and a driven shaft, planetary gearing, a planet wheel carrier arranged in said planetary gearing, planet wheels rotatably mounted on said planet wheel carrier, two central wheels included in said planetary gearing in driving association with said planet wheels, said central wheels being fixed to said driving shaft and said driven shaft respectively, a support stationarily mounted relative to the variable speed gear, piston operated liquid pumping means intercalated between said stationary support and said planet wheel carrier with their pistons extending longitudinally of said variable speed gear, a tumbler carried by said support for actuating said pistons, a closed liquid circulation channel communicating with said pumping means, a cylinder block housing said pumping means and said channel, rotary valves included in said circulation channel in said cylinder block with their axes extending longitudinally of said variable speed gear for infinitely varying the speed of said carrier, a sealing ring screwed into a screw bore in said block, coaxially with each of said valves, an inner sealing face on said sealing rings bearing against a mating sealing face in the respective screw bore, and a conical shoulder on each of said valves elastically bearing against a mating conical face on the respective sealing ring.

6. In an infinitely variable speed gear, a driving shaft and a driven shaft, planetary gearing, a planet wheel carrier arranged in said planetary gearing, planet wheels rotatably mounted on said planet wheel carrier, two central wheels included in said planetary gearing in driving association with said planet wheels, said central wheels being fixed to said driving shaft and said driven shaft respectively, a support stationarily mounted relative to the variable speed gear, piston operated liquid pumping means intercalated between said stationary support and said planet wheel carrier, a tumbler carried by said support for actuating said pistons, a closed liquid circulation channel communicating with said pumping means, a cylinder block housing said pumping means and said channel, rotary valves included in said circulation channel in said cylinder block with their axes extending longitudinally of said variable speed gear for infinitely varying the speed of said carrier, a sealing ring screwed into a screw bore in said block coaxially with each of said valves, an inner sealing face on said sealing rings bearing against a mating sealing face in the respective screw bore, a conical shoulder on each of said valves elastically bearing against a mating conical face on the respective sealing ring, a neck on each of said valves extending through the respective sealing ring, and a driving gear wheel displaceably but non-rotatably carried by each of said necks.

7. In an infinitely variable speed gear, a driving shaft and a driven shaft, planetary gearing, a planet wheel carrier arranged in said planetary gearing, planet wheels rotatably mounted on said planet wheel carrier, two central wheels included in said planetary gearing in driving association with said planet wheels, said central wheels being fixed to said driving shaft and said driven shaft respectively, a support stationarily mounted relative to the variable speed gear, piston operated liquid pumping means intercalated between said stationary support and said planet wheel carrier, a closed liquid circulation channel communicating with said pumping means, a cylinder block housing said pumping means and said channel, rotary valves included in said circulation chanel for infinitely varying the speed of said carrier, a sealing ring screwed into a screw bore in said block coaxially with each of said valves, an inner sealing face on said sealing rings bearing against a mating sealing face in the respective screw bore, a conical shoulder on each of said valves elastically bearing against a mating conical face on the respective sealing ring, a neck on each of said valves extending through the respective sealing ring, a driving gear wheel displaceably but non-rotatably carried by each of said necks, a common control member for adjusting all of said driving gear wheels conjointly, and an axially adjustable socket rotatably carrying said control member.

8. In an infinitely variable speed gear, a driving shaft and a driven shaft, planetary gearing, a planet wheel carrier arranged in said planetary gearing, a liner surrounding the variable speed gear and connected to said planet wheel carrier, planet wheels rotatably mounted on said planet wheel carrier, two central wheels included in said planetary gearing in driving association with said planet wheels, said central wheels being fixed to said driving shaft and said driven shaft respectively, a support stationarily mounted relative to the variable speed gear, piston operated liquid pumping means intercalated between said stationary support and said planet wheel carrier with their pistons extending longitudinally of said variable speed gear, a tumbler carried by said support for actuating said pistons, a closed liquid circulation channel communicating with said pumping means, a cylinder block connected to said liner and housing said pumping means, said channel, and a liquid supply chamber for replenishing a liquid deficiency in said channel, an auxiliary pump for maintaining the pressure in said supply chamber, a universal joint interconnecting said liner and said tumbler, and throttling means included in said channel for infinitely varying the speed of said carrier.

9. In an infinitely variable speed gear, a driving shaft and a driven shaft, planetary gearing, a planet wheel carrier arranged in said planetary gearing, a liner surrounding the variable speed gear and connected to said planet wheel carrier, planet wheels rotatably mounted on said planet wheel carrier, two central wheels included in said planetary gearing in driving association with said planet wheels, said central wheels being fixed to said driving shaft and said driven shaft respectively, a support stationarily mounted relative to the variable speed gear, piston operated liquid pumping means intercalated between said stationary support and said planet wheel carrier with their pistons extending longitudinally of said variable speed gear, a tumbler carried by said support for actuating said pistons, a closed liquid circulation channel communicating with said pumping means, a cylinder block connected to said liner and housing said pumping means, said channel, and a liquid supply chamber for replenishing a liquid deficiency in said channel, a piston operated auxiliary pump for maintaining the pressure in said supply chamber rotating together with said planet wheel carrier, an eccentric disc for actuating said auxiliary pump, a universal joint interconnecting said liner and said tumbler, and throttling means included in said channel for infinitely varying the speed of said carrier.

10. In an infinitely variable speed gear, a driving shaft, and a driven shaft, planetary gearing, a planet wheel carrier arranged in said planetary gearing, a liner surrounding the variable speed gear and connected to said planet wheel carrier, planet wheels rotatably mounted on said planet wheel carrier, two central wheels included in said planetary gearing in driving association with said planet wheels, said central wheels being fixed to said driving shaft and said driven shaft respectively, a support stationarily mounted relative to the variable speed gear, piston operated liquid pumping means intercalated between said stationary support and said planet wheel carrier with their pistons extending longitudinally of said variable speed gear, a tumbler carried by said support for actuating said pistons, a closed liquid circulation channel communicating with said pumping means, a cylinder block connected to said liner and housing said pumping means, said channel, and a liquid supply chamber for replenishing a liquid deficiency in said channel, a pressure equalizing valve connected with said supply chamber, an auxiliary pump for maintaining the pressure in said supply chamber, a universal joint interconnecting said liner and said tumbler, and throttling means included in said channel for infinitely varying the speed of said carrier.

11. In an infinitely variable speed gear, a driving shaft and a driven shaft, planetary gearing, a planet wheel carrier arranged in said planetary gearing, a liner surrounding the variable speed gear and connected to said planet wheel carrier, planet wheels rotatably mounted on said planet wheel carrier, two central wheels included in said planetary gearing in driving association with said planet wheels, one of said central wheels being fixed on said driving shaft and the second of said central wheels being fixed on said driven shaft, a supporting sleeve stationarily mounted relative to the variable speed gear and surrounding said driving shaft, piston operated liquid pumping means intercalated between said stationary support and said planet wheel carrier with their pistons extending longitudinally of said variable speed gear, a tumbler carried by said supporting sleeve for actuating said pistons, a closed liquid circulation channel communicating with said pumping means, a cylinder block connected to said liner and housing said pumping means and said channel, a universal joint interconnecting said liner and said tumbler, and throttling means included in said channel for infinitely varying the speed of said carrier.

12. In an infinitely variable speed gear, a driving shaft, a brake disc carried by said driving shaft for effecting the speed variation in the variable speed gear devoid of predetermined speed stages, a driven shaft, planetary gearing, a planet wheel carrier arranged in said planetary gearing, planet wheels rotatably mounted on said planet wheel carrier, two central wheels included in said planetary gearing in driving association with said planet wheels, one of said central wheels being fixed on said driving shaft and the second of said central wheels being fixed on said driven shaft, a support stationarily mounted relative to the variable speed gear, and means intercalated between said stationary support and said planet wheel carrier for infinitely varying the speed of said carrier.

FRANZ SCHMID.